(12) United States Patent
Cronin et al.

(10) Patent No.: US 8,157,375 B2
(45) Date of Patent: Apr. 17, 2012

(54) VARIABLE PRISM EYEGLASSES

(76) Inventors: John V. Cronin, Newport Beach, CA (US); William C. Cronin, Irvine, CA (US)

(*) Notice: Subject to any disclaimer, the term of this patent is extended or adjusted under 35 U.S.C. 154(b) by 0 days.

(21) Appl. No.: 13/052,892

(22) Filed: Mar. 21, 2011

(65) Prior Publication Data
US 2011/0194071 A1    Aug. 11, 2011

Related U.S. Application Data

(63) Continuation-in-part of application No. 12/462,764, filed on Aug. 10, 2009, now abandoned.

(51) Int. Cl.
*G02C 7/14* (2006.01)
(52) U.S. Cl. .......... 351/175; 351/159; 351/177
(58) Field of Classification Search .......... 351/49, 351/57, 59, 159, 175, 177, 200, 203, 223
See application file for complete search history.

(56) References Cited

U.S. PATENT DOCUMENTS

| | | | | |
|---|---|---|---|---|
| 4,744,633 A | * | 5/1988 | Sheiman | 359/465 |
| 5,414,476 A | * | 5/1995 | Pavelle et al. | 351/49 |
| 5,452,030 A | * | 9/1995 | Feinbloom | 351/175 |

* cited by examiner

*Primary Examiner* — Darryl J Collins
(74) *Attorney, Agent, or Firm* — Richard D. Clarke (57) ABSTRACT

The present invention is directed to an eyeglass device that has manually variable prisms to correct strabismus; that is, double vision. The variable prism eyeglasses consist of an eyeglass frame that holds two primary rings in position and provides baseline reference points for alignment. Prism lenses and corrective lenses fit inside the primary rings and allow the two prism lenses of each primary ring to rotate independently and to hold the corrective lens fixed in place relative to the primary rings. Detent channels on the upper surface and lower surface of the primary rings are the means by which the prisms are adjusted. Each prism lens is moved and positioned via a prism lens pin located in the base of each prism lens. The prism lens pins fit into the detents in the detent channels of the primary ring. The detent selected determines the amount of corrective power the prisms will produce.

18 Claims, 11 Drawing Sheets

VARIABLE PRISM EYEGLASSES

FIELD OF THE INVENTION

The present improvements in the invention are directed to a variable prism eyeglass system that is simpler in design, has fewer moving parts, and is easier to use for both physicians and patients. Additionally, the method of use has been simplified. More particularly, the improved lenses are mold cast, magnets hold the rotating prisms together, rotating prisms click into position and varying washer thicknesses allow for a pin depth tailored specifically to the patient.

BACKGROUND OF THE INVENTION

Strabismus affects millions of Americans. While exact numbers are not known, it is estimated that as many as 24 million people are afflicted with this condition. Strabismus is a visual impairment and can be defined as a condition in which the visual axes of the eyes are not parallel and the eyes appear to be looking in different directions. In divergent strabismus, or exotropia, the visual axes diverge. If the visual axes converge, it is called convergent strabismus or esotropia. One of the dangers associated with strabismus is that the brain may come to rely more on one eye than the other and that part of the brain circuitry connected to the less-favored eye fails to develop properly, leading to a condition called amblyopia (blindness) in that eye.

Unfortunately, there are many cases in which vision therapy of any kind will not be effective. A patient whom has suffered a stroke, has permanent nerve damage, has been diagnosed with amblyopia or a host of other conditions will not respond to the invention, or any type of vision therapy.

Severe strabismus may require surgery. The surgery is designed to increase or decrease the tension of the small muscles outside the eye. These muscles are called the extraocular eye muscles. The six extraocular eye muscles move the eye in all directions. When strabismus surgery or vision therapy is needed, and a child is involved, the sooner it is done, the better the chance of the child achieving normal binocular vision.

While the exact cause of strabismus is not entirely understood, we do know that it is more prevalent in some people than others. Many patients that have been diagnosed with strabismus have suffered a serious blow to the head, causing the brain to send false signals to the extraocular muscles which rotate the eye. Further, senior citizens are often diagnosed with strabismus as well as children with autism and cerebral palsy.

By prismatically redirecting the focal point of each eye to one common visual target, strabismus can be therapeutically treated. The invention accomplishes this through the use of very thin, high index prisms. Once the brain is allowed to interpret one image, the invention can be used to slowly reduce the prism strength in one half diopter increments. With time, the patient may reach a point where the use of the Variable Prism Glasses will no longer be necessary, and use of the invention can be discontinued. Thus, the invention offers a non-surgical alternative to the treatment of strabismus.

The invention described herein is directed at providing a solution to the problem of strabismus. Specific conditions within strabismus relate more directly to the direction of displacement. If the eyes have a tendency toward becoming out of alignment, it is known as a phoria, if they are always displaced, it is a tropia. A phoria will occur with fatigue or under the effect of certain medications or alcohol. Horizontal displacement is more common, be it exophoria/tropia (movement out towards the temple), or esophoria/tropia (movement in towards the nose) than vertical displacement (hyperphoria/tropia which is upward movement of one of the eyes). Additionally, please note that hypophoria/tropia is not described, as hyperphoria/tropia is described for either the right or left eye.

It is important to note that a patient diagnosed with strabismus can be afflicted with more than one type of directional misalignment. The invention treats all types of directional misalignment, whether it is horizontal or vertical, or a combination of the two. Additionally, it will treat convergence insufficiency which is another type of horizontal strabismus occurring when both eyes turn inward when reading. Moreover, the invention treats each eye separately; regardless of the opposite eyes directional displacement. Strabismus can also be called Convergence Insufficiency (CI).

Phoria is a tendency for the eye to become out of alignment when one eye is obstructed; Tropia occurs when the eye is out of alignment even when both eyes are unobstructed.

The novel present invention of variable prism glasses seeks to address these well documented problems experienced by both the medical community and patients. No relevant prior device has been found after extensive searching through databases and trade literature.

The invention may allow the medical community to alleviate the effects of strabismus, and in some cases, eliminate it. There are two methods of treatment available, and are referred to as active (or therapeutic) treatment and passive treatment.

Active treatment provides the health care provider with a varied range of therapeutic options. The health care provider has the ability to change the treatment program as often as necessary without the interruption of ordering new fixed prism glasses, as the invention can be adjusted as often as necessary to meet the ever changing needs of the patient. The objective of active treatment is to therapeutically retrain the eye muscles and brain to realign the eyes to just one visual target.

When the invention is used in a passive fashion, it allows the patient to manipulate the prism strength without removing the invention. Further, the invention allows the patient to adjust the prism power to the minimum strength required. This is a function that is not possible with a standard pair of prism glasses where no variability is possible. It is important to note that passive treatment is not therapeutic treatment; it is not the objective of passive treatment to permanently alleviate or eliminate strabismus. Since it is well known that the eye muscles develop fatigue as the day progresses, the invention, when used passively, simply allows the patient to adjust the amount of prism needed as the day progresses, thereby accurately countering the subjective effects of strabismus.

In view of the visual problems associated with the modern day active and passive treatment of strabismus, the invention addresses these problems and provides a unique solution, often solving visual blurring and diplopia associated with strabismus, through the use of rotating prisms integrated into a standard pair of eyeglasses frames.

Normal binocular vision provides the patient with a clear stereoscopic image of one visual target creating a single clear visual image consisting of both depth and shape. A person afflicted with strabismus (malalignment of both eyes) lacks this ability, as the eyes as a set, lack the ability to fuse on one visual target at the same time. The prism lenses in the present invention rotate to change the visual target, and allow the patient to realign incoming light onto the fovea, producing one visual target, often creating normal fusion of binocular vision for patients treated.

It is important to note that when the invention is used passively, that is, by the patient, the glasses meet the ever-changing prism needs of the patient through minor adjustment. When used actively, therapeutically, the setting of the glasses can be preselected by the health care provider in charge of the patient's visual therapy. It is the intent that the strength of the variable prism would be to reduce the amount of prism, thus reducing or eliminating the patients strabismus and need for the invention altogether.

In this respect, before explaining at least one embodiment of the invention in detail, it is to be understood that the invention is not limited in its application to the details of construction and to the arrangement of the components set forth in the following description or illustrated in, the drawings. The invention is capable of other embodiments and of being practiced and carried out in various ways. In addition, it is to be understood that the phraseology and terminology employed herein, are for the purpose of description and should not be regarded as limiting.

SUMMARY OF THE INVENTION

Therefore, it is the overall object of the present invention to provide a novel eyeglass prism system to eliminate or alleviate the above mentioned conditions. One objective of the present invention is to provide variable prisms to be installed in eyeglasses to relieve patients of strabismus. Another major object is to provide a way for a physician to treat a patient by therapeutically moving the eye globe over a given period of time to a position which will allow for normal and unassisted binocular vision. An additional objective is to provide the patient with a rotatable pin to adjust the dioptic setting of both prisms in the eyeglasses to optimize visual acuity when suffering strabismus. Another objective of the present invention is to provide a simple variable prism design to allow relatively inexpensive manufacture and reasonable retail cost to patients. Lastly, another objective is to provide multiple embodiments of the variable prism. To date, and to the knowledge of the Applicants, no such variable prism system has been invented to treat strabismus.

The four lenses that are novel to the invention are prisms. A prism can be defined as an optical grade of transparent plastic or glass with two polished surfaces. The surfaces of the prism are inclined toward each other. As light passes through the prism, it is refracted or bent and the degree, or angle, of prismatic refraction is dependent on the material and angle of incline in the prism.

Each set of Variable Prism Glasses (VPG) contain four prisms, two for each eye. Each prism lens can be rotated independently by a health care provider or patient. When light passes through this set of prism lenses, and the prism lenses are rotated, the degree of refraction or direction of gaze changes. In other words, by rotating the prisms, the patients center of vision changes. This refractive change gives the health care provider or patient the ability to realign the visual target with the fovea in each eye. The fovea, or fovea centralis, is a depression toward the center of the retina where the vision is most acute.

There are multiple novel features associated with variable prisms glasses One of these features is the ability of the health care provider to therapeutically treat strabismus in a patient through adjustment of the prisms. Another novel feature is that the patient can make minor adjustments to the prisms using the rotatable pins. An additional novel feature is that with the present invention, strabismus can be greatly alleviated, and in some cases corrected. All these novel features mean there are multiple advantages to millions of people affected by strabismus. They are able to remove frustration, improve vision, drive and move safely, and potentially eliminate this condition. The above-mentioned difficulties and problems may theoretically be overcome by the present invention. The present invention of variable prisms is intended to be installed in an eyeglass frame. The eyeglasses are typically round and comprised of a total of six lenses, three devoted to each eye. Two of the lenses, one for each eye, are standard prescription corrective lenses that the patient would use to correct vision clarity. These two lenses may be fixed in place. The four lenses that are novel to the invention are prisms which can be rotated to achieve a desired alignment.

IMPROVEMENTS IN THE PRESENT INVENTION

The current invention is simpler in design in that there are fewer parts. The internal rings, which once surrounded and were glued in place to each prism have been eliminated and are now created in a mold as part of the lens itself. The prism pins which protrude through the primary ring detent channels are used to rotate the separate prisms. The current invention uses detents incremented in ½ diopter locations in the detent channels. The detents may be reduced to allow the prism pin to rotate more freely into position, or the channels may be smooth. Washers are used of varied thicknesses that control the depth at which the prism pin sits. When a thicker washer is used, the pin will sit higher, allowing the pin to sit just atop the detents, when the pin is rotated with this thicker washer in place, the pin will not have to be lifted and placed into the appropriate detents, rather it can be rotated relatively freely and "click" into position. This feature is used when treating a patient who, in the opinion of their health care provider, can rotate the lenses themselves, and is cognizant enough to do so. When a thinner washer is used, the pin will position itself deep in the detents, thus making it more difficult to adjust. A thinner washer will be used when treating children or autistic patients.

The prism lenses in the new invention are made differently. In the old design the lenses were cut out of a blank lens to a custom size, this was restricting in many respects, as the shape was limited to a simple circle. The lenses now are cast in a mold, and are significantly different in shape. It is this change that has allowed the elimination of several parts. The prism lens material is now the highest grade of optical plastic available. The plastic is called OKP4, and has an index of 1.67. With the new design using a higher index plastic, the overall thickness is thinner allowing the use of less material thus making the glasses lighter. A high quality anti-glare coating is applied to one side of the prism lenses, reducing glare and bright reflections.

A unique feature of this application is that magnets hold the rotating prisms together as well as holding the assembly as a whole inside the primary ring. There are a total of 6 two millimeter magnets which surround the outermost perimeter of one of the prism lens and weigh less than 0.3 grams total (one tenth of an ounce) or about 0.015 oz.

The Variable Prism Eyeglasses consist of an eyeglass frame that holds two primary rings in position and provides baseline reference points for alignment of the primary rings. The Variable Prism Eyeglasses are symmetrical about the central bridge member and the description that follows will pertain to both sides of the design concept. At the top center position of each eyeglass frame is a permanent eyeglass frame reference point. This designated point when aligned with each primary ring reference point marked on each primary ring represents the center zero-zero corrective position. Additionally, it is this mark which is used to correctly position the primary rings inside of the eyeglass frame and align the corrective lens. The primary ring fits inside the eyeglass frame and is held tightly in place via a simple clamping mechanism. This method of holding a lens works exactly the same as a standard pair of eyeglasses holding a standard corrective lens.

Both the prism lenses and the corrective lens fit inside of the primary ring. It allows each prism lens to rotate independently of the other and also holds the corrective lens fixed in place relative to the primary rings. Detent channels on the upper surface and lower surface of the primary rings are the means by which the prisms are adjusted.

Each prism lens is moved and positioned via a prism lens pin located in the base of each prism lens. The prism lens pins fit into the detents in the detent channels of the primary ring. The detent selected determines the amount of corrective power the prisms will produce.

The outer prism lens is the first of two prisms and is placed inside of the primary ring after the insertion of a washer which can be thick or thin depending upon the end user of the glasses. The outer prism lens is identical in refractive power to that of the inner prism lens, but differs from the inner prism lens in that the outer prism lens contains one or more magnets which hold the two prisms together. The magnets are arraigned in a circular fashion around the outermost perimeter of the outer prism lens. At the thinnest portion of the outer prism lens the magnets are spaced slightly farther apart to take advantage of a greater amount of material to fix the magnets in place. Inserted at the thickest edge and running parallel to the face of the outer prism lens is the prism lens pin. In rare cases, when the patient is afflicted with strabismus which affects the vertical movement of the eye, referred to as "hypertropia," the pin may be positioned 90 degrees to the left or right of the base to compensate for the hypertropia condition.

There are six magnets placed in the outer prism lens. The magnets are cylindrical in shape and are used to attach the outer prism to the thick or thin washer. On the side opposite the outer prism is the standard thickness washer. When each prism lens is rotated, the prism lens pin which is attached directly to the prism lens is raised from the detent and the magnets then break contact with the opposing washer and rotate about the circular center-line of the washer. When the correct position is attained, the prism lens pin is then lowered into the correct detent and locked in place by the magnets. This operation differs little with the thick washer, rather than lifting the prism lens pin from its detent, the pin will simply be rotated to its correct location and the magnets will not break contact with the washer. Due to the thickness of the washer, the prism pins will glide across each detent, creating a "clicking" effect. Once the magnets adhere to the outer prism lens, the prism, lens can then be placed into the primary ring. When this operation takes place the prism lens pins attached to the outer prism lens is easily inserted through the detent channel in the primary ring. When in proper position, the outer prism lens will be magnetically attached to the variable thickness washer and the prism lens pin will be protruding through the channel detent in the primary ring.

The fixed thickness washer is the second of two washers that fit inside of the primary ring. This washer is bonded into place in the groove of the inner prism lens and the entire assembly is then placed inside the primary ring. When the fixed thickness washer is placed in the primary ring it rides on top of the magnets which are fixed inside of the outer prism lens, and in-turn attaches the inner prism lens to outer prism lens through magnetic force.

Corrective lenses are adhesively held in a fixed position within the primary rings, and held permanently in place with snap rings. In unique cases requiring a greater amount of prismatic power the corrective lens may contain additional prism. In these cases the position of the lens is critical, and will be justified by aligning the corrective lens to a reference point in the primary ring. This indent will represent the vertical center-line and will be used to align the primary ring with the vertical axis of the eyeglass frame as well as the vertical axis of the corrective lens.

When the prism lens pins are rotated to the center position in the center detent, and the primary ring reference point is centered on the eyeglass frame reference point, a zero-zero corrective condition is selected. In almost all cases where strabismus has been identified in the patient, the visual complications associated with this condition will cause the eyes to be offset right or left of center along a horizontal path, not up or down. In these cases the corrective position of the primary rings will have a dioptic corrective power of zero-zero as the prism lenses are in perfect opposition with one another (i.e., the +Y corrective power of one prism cancels out the −Y corrective power of the other, thus, zero-zero). This position is applicable to almost all cases of strabismus. In this position, the top prism lens pin will be in the center detent and pointed straight up relative to the eyeglass frame, and the bottom prism lens pin will be pointed straight down in the center detent, thus the primary rings are centered vertically relative to the eyeglass frame. In some special cases, the prism lenses and primary rings will be rotated when the patient's strabismus causes the eyes to be displaced obliquely at an angle off of the horizontal or vertical.

The Variable Prism Eyeglasses can be used by a wide category of patients, as the severity of strabismus varies greatly and afflicts people of all ages. Use of the device will fall into two categories, passive or active (therapeutic). It will allow the patient or the patient's health care provider to change the prismatic power (measured in diopters) by simply rotating the pins associated with each of the four prisms. The changes can be made in as little as ½ diopter increments by counter-rotating the prisms and if necessary the primary rings, in which the prisms and corrective lens are mounted.

The foregoing has outlined rather broadly the more pertinent and important features of the present Variable Prism Eyeglasses in order that the detailed description of the application that follows may be better understood so that the present contribution to the art may be more fully appreciated. Additional features of the design described below form the subject of the claims of this disclosure. It should be appreciated by those skilled in the art that the conception and the disclosed specific embodiment may be readily utilized as a basis for modifying or designing other structures and methods for carrying out the same purposes of the present design. It should also be realized by those skilled in the art that such equivalent constructions and methods do not depart from the spirit and scope of this application as set forth in the appended claims.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents which may be resorted to, should fall within the scope of the invention.

These, and other, novel features and advantages of the present invention are set forth more completely in the accompanying drawings and the following description.

BRIEF DESCRIPTION OF THE DRAWINGS

The accompanying drawings, which are incorporated in and form a part of this specification, illustrate embodiments of the invention and together with the description, serve to explain the principles of this invention. Details of the invention, and of the preferred embodiments thereof, will be further understood upon reference to the drawings, wherein closely related elements have the same number but different alphabetical suffixes, and further wherein.

DETAILED DESCRIPTION OF THE PREFERRED EMBODIMENTS

For a fuller understanding of the nature and objects of the invention, reference should be had to the following detailed description taken in conjunction with the accompanying drawings wherein similar parts of the invention are identified by like reference numerals.

The purpose of the Variable Prism Glasses (VPG) is to correct strabismus or if used passively, to allow the patient to live a better, more visually capable life with strabismus. As light passes through the VPG it is refracted to match the patient's degree of strabismus, or in the opinion of the patients health care provider, a refractive setting would be chosen which would be therapeutically more beneficial to the patient. Because the degree of strabismus varies throughout the day, the VPG can be adjusted to meet the patient's fluctuating needs. The ability of the invention to change its refractive properties to meet the needs of the patient is described herein.

Figure 1:
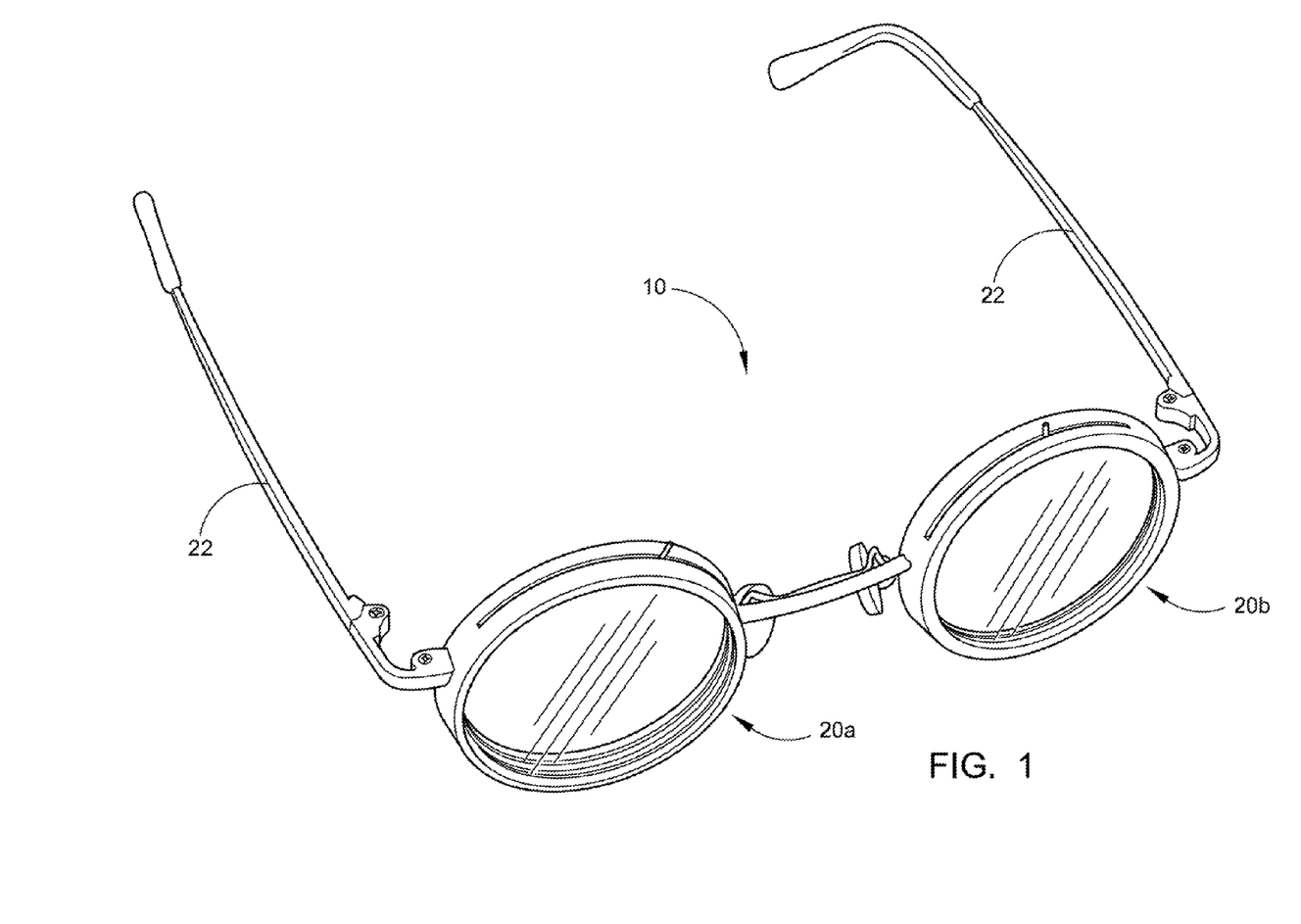
FIG. 1 depicts a perspective view of a preferred embodiment of variable prism eyeglasses of the present invention.

Referring first to FIG. 1, a perspective view of one embodiment is shown of variable prism eyeglasses of the present invention. Typical eyeglasses with variable prisms installed 10 are seen with a right prescription lens and two variable prisms 20a and a left prescription lens with two variable prisms 20b. Alternatively, another embodiment of the present invention includes a right and left prescription lens and one variable prism for each eye. Still another embodiment includes a right and left prescription lens with two variable prisms. Yet other embodiments would have one, or two variable prisms for both eyes, or without any prescription lenses at all. Therefore, many embodiments exist.

Figure 2:
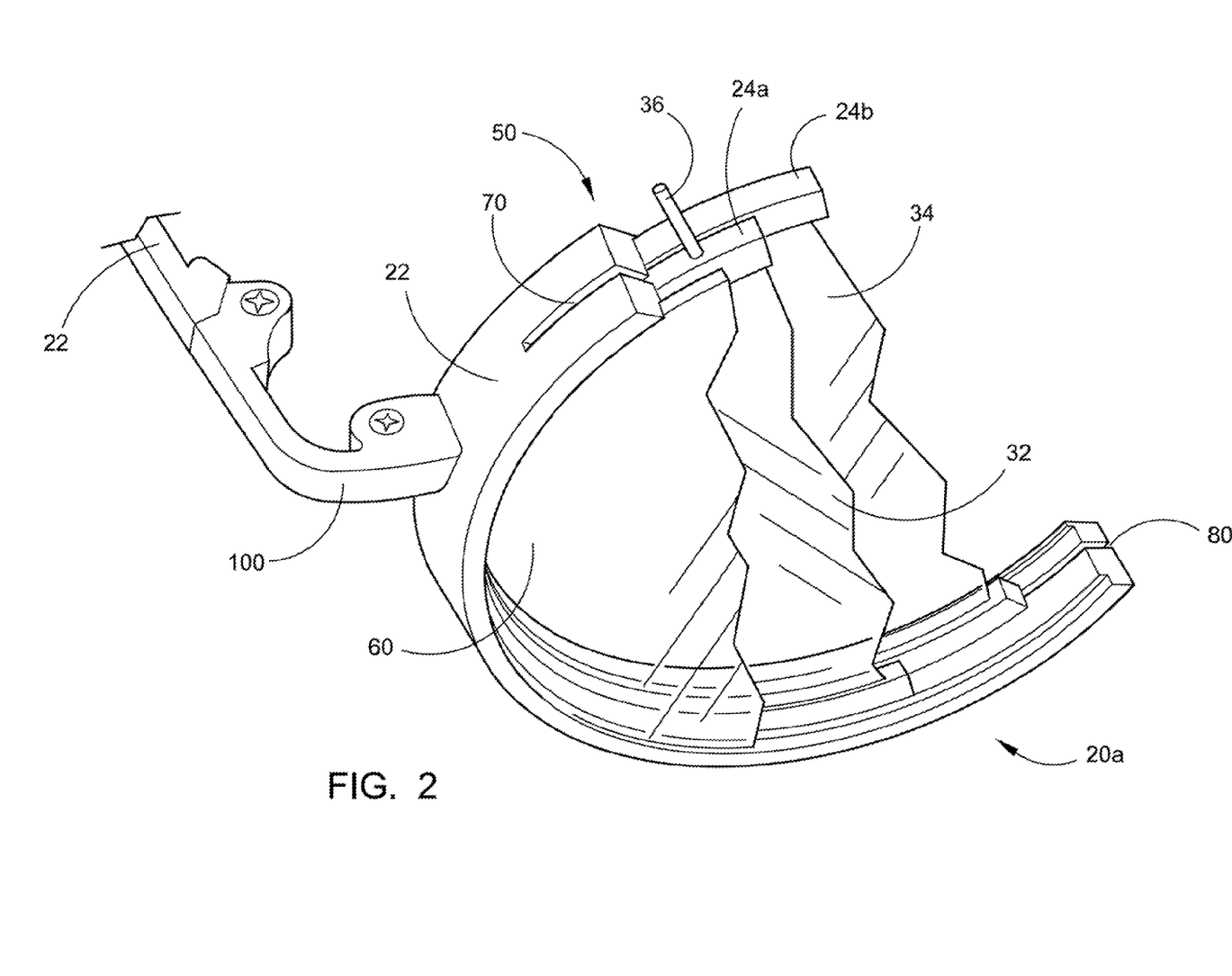
FIG. 2 depicts a partial perspective section view of a typical two prism embodiment with prescription lens of the present invention.

Referring now to FIG. 2, a partial perspective section view of a typical two prism embodiment with prescription lens is shown of the present invention. A right prescription lens with two variable prisms 20a is shown. An eyeglass frame 22 has an attachment mechanism 100 to an Assembly C 50. Within the frame 22, Assembly C 50 comprises a prescription lens 60, a right plastic lens holder 24a that also comprises a first rotatable pin 36 wherein the right plastic lens holder 24a holds an outer prism 32. In addition, Assembly C 50 comprises a second right plastic lens holder 24b that holds an inner prism 34. The eyeglass frame 22 is further comprised of a first and second slot 70 and 80. More specifically, the outer prism lens 32 and its holder 24a are bonded together and a hole for the first pin 36 is drilled though its holder 24a and into a base of the outer prism 32.

Summarizing, in a preferred embodiment, a prescription lens 60 is combined atop a right outer variable prism 32, wherein the right outer prism 32 is further combined atop a right inner variable prism 34. And furthermore, the right prescription lens 60, the right outer prism 32, and the right inner prism 34 are secured respectively in right lens holders 24a and 24b.

Figure 3:
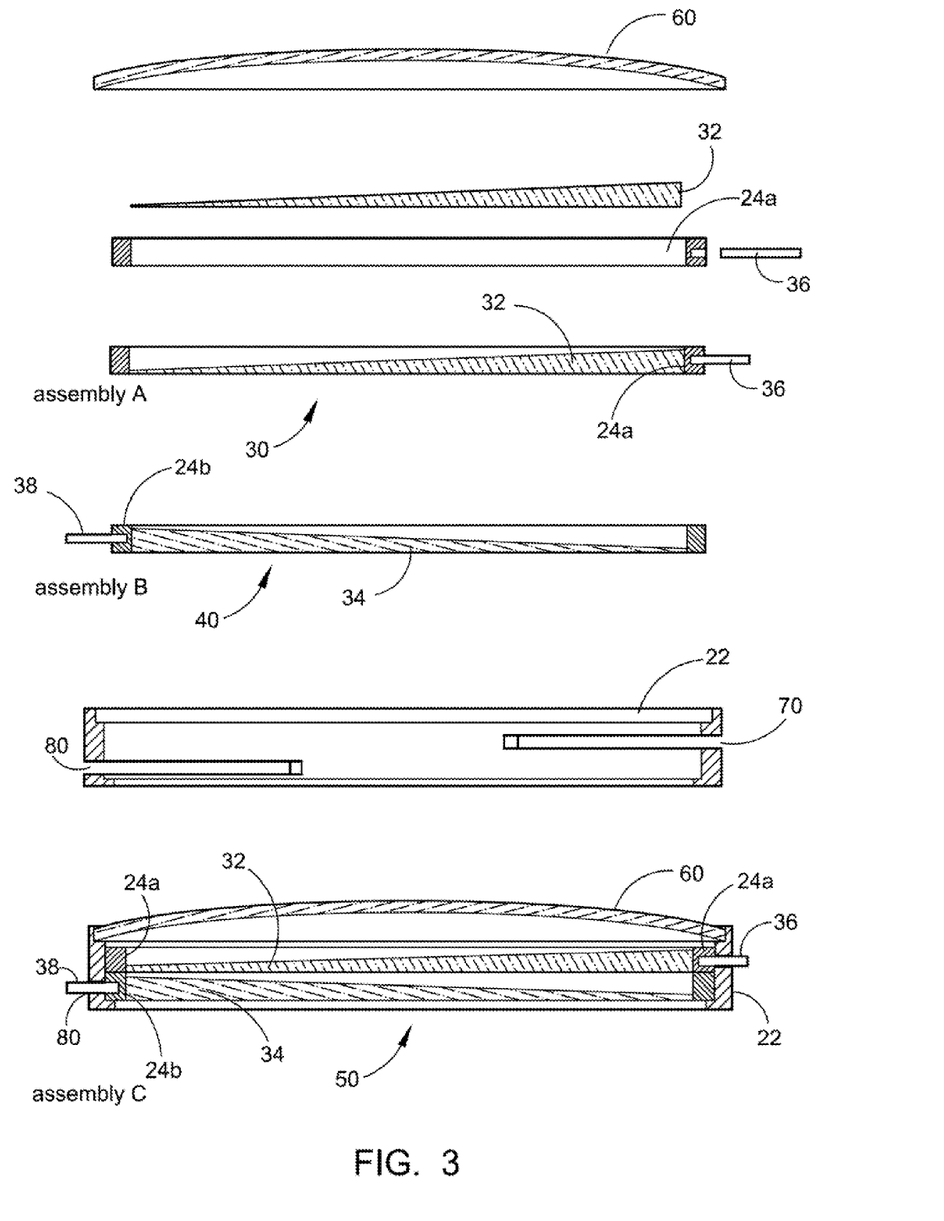
FIG. 3 depicts an exploded section view of a typical two prism embodiment with prescription lens of the present invention.

Referring next to FIG. 3, an exploded section view of a typical two prism embodiment with prescription lens of a preferred embodiment is shown of three assemblies 30, 40 and 50 of the present invention. Assembly A 30 is comprised of an outer prism 32, a plastic lens holder 24a and a first rotatable pin 36. Assembly B 40 is Assembly A 30 rotated 180 degrees. Assembly B 40 is in like fashion comprised of an inner prism 34 and a plastic lens holder 24b. Also shown in Assembly B 40 is a second rotatable pin 38. Assembly C 50 is comprised of Assembly A 30, Assembly B 40, a prescription lens 60, and an eyeglass frame 22. The eyeglass frame 22 is further comprised of a first and second slot 70 and 80. More specifically, the outer prism 32 and its holder 24a are bonded together and a hole (unnumbered and not shown) for a first pin 36 is drilled though its holder 24a and into a base of the outer prism 32. The first pin 36 is bonded to the base of the prism 32. Therefore, outer prism 32 lens holder 24a, and first pin 36 are one assembly A 30. This first rotatable pin 36 is used to rotate Assembly A 30 in the eyeglass frame 22 in the first slot 70 through some degree range described in subsequent figures.

In a similar way, the second rotatable pin 38 penetrates the lens holder 24b and the inner prism 34 through a second hole (not shown and unnumbered). This second pin 38 is drilled through its holder 24b and into a base of the inner prism 34. The second pin 38 is bonded to the base of the inner prism 34. Therefore, inner prism 34, lens holder 24b, and the second pin 38 are one Assembly B 40. This second rotatable pin 38 is used to rotate Assembly B 40 in the eyeglass frame 22 in the second slot 80 through some degree range described in subsequent figures.

Figure 4:
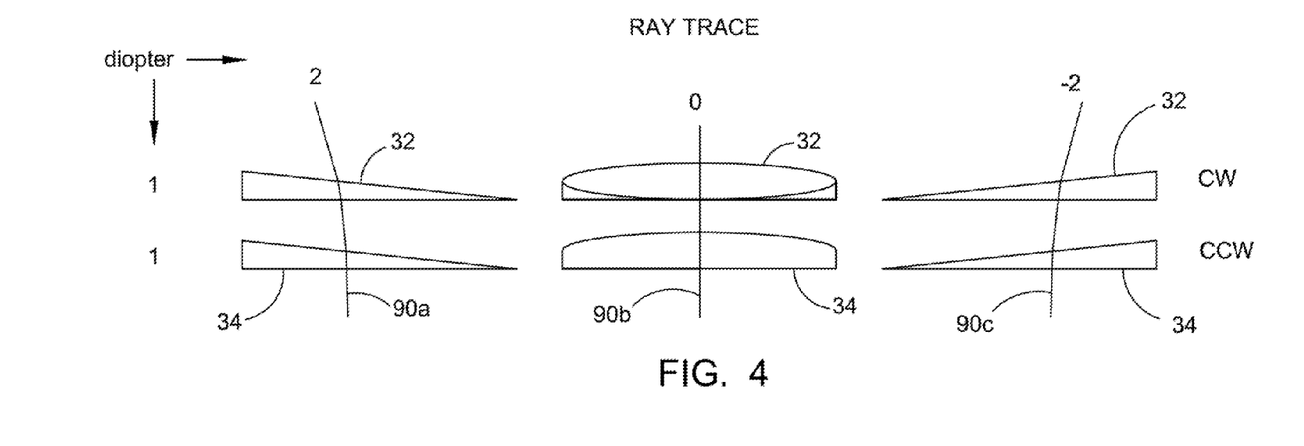
FIG. 4 depicts a partial view of eyeglass prisms showing multiple light ray traces for numerous lens diopters of multiple embodiments of the present invention.

Assembly A 30 and Assembly B 40 are mounted in an Assembly C 50 with bases of Assembly A 30 and B 40 opposite each other, that is, in the optically neutral position shown in FIG. 4A and FIG. 4B. The first pin 36 protrudes from Assembly C 50 through the first slot 70 and the second pin 38 protrudes through the second slot 80.

Summarizing, in the previous embodiment as shown in FIG. 3, a prescription lens 60 is combined atop a right outer variable prism 32, wherein the right outer prism 32 is further combined atop a right inner variable prism 34. Furthermore the right prescription lens 60, the right outer prism 32, and the right inner prism 34 are secured in the right lens holder marked as 22 in FIG. 3. Similarly, a prescription lens 60 is combined atop a left outer variable prism 32, wherein the left outer prism 32 is further combined atop a left inner variable prism 34. In addition, the prescription lens 60, the left outer prism 32, and the left inner prism 34 are secured in the left lens holder marked as 22 in FIG. 3.

Another possible embodiment is without prism holders 24a and 24b. The prisms 32 and 34 are secured directly into the eyeglass frame 22. Therefore, the first and second rotatable pins 36 and 38 are attached directly to the upper and inner prisms 32 and 34 of their respective prescription lens with two variable prisms 20a and 20b of FIG. 1.

Dimensions of the eyeglass frame and lenses are not shown. However, the dimensions are generally similar to conventional eyeglasses. Materials may be similar to conventional eyeglasses, including plastics, various metal options, and glass.

Figure 5:
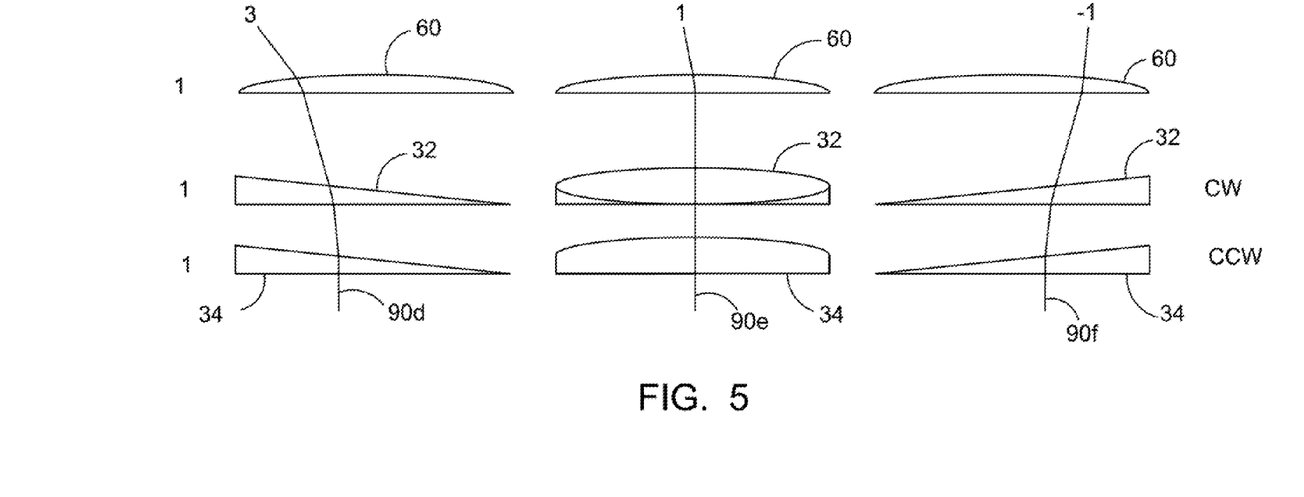
FIG. 5 depicts a partial view of eyeglass prisms showing multiple light ray traces for numerous lens diopters of multiple embodiments of the present invention.

Referring to FIG. 4 and FIG. 5, a partial view of a preferred embodiment of eyeglass prisms is shown of multiple light ray traces 90a, 90b, 90c, 90d, 90e and 90f for numerous prism diopters of multiple embodiments of the present invention. "Ray trace" is a common term used to describe how light is refracted through a lens, in this case, through two prisms. Under the condition where both eyes are only slightly and equally affected, one prism lens per eye may be used. However it should be noted that a case such as this would be rare. The prism can also be physically rotated allowing the patient or health care provider to coordinate the left eye with the right eye. This rotation allows adjustment of the patient's vision. However, if strabismus is at all severe, the two prism system can be used to eliminate the vertical component.

What follows is a description of how the simultaneous rotation of each prism affects the user's center of vision. More specifically, the "center of vision," or how light refracts and affects the user's ability to pinpoint a specific object with both eyes at the same time.

As previously discussed, strabismus is the inability of both eyes to simultaneously fuse and or track on one visual target at the same time. Specifically, the prisms are counter rotated allowing the user or health care provider to realign the center of vision. Both prism pairs can be rotated, or adjusted, at the same time, thus allowing realignment of both eyes, bringing the center of vision back to a correct position.

Continuing with reference to FIG. 4, the three traces 90a, 90b and 90c represents the movable range of the center of vision. As each prism is rotated in the opposite direction, in unison with its counterpart, the center of vision will move from one trace 90a to another 90c. In all cases an outer prism 32 is rotated the same number of degrees as the opposite inner prism 34. This prism position then represents the common focal point, and both eyes can now view one object at the same time.

FIG. 4 shows the prisms in three different configurations. Each of the three traces 90a, 90b and 90c in this example, shows each prism in different states of rotation. The left trace 90a is the +2 diopter prism configuration. The center trace 90b is the neutral diopter prism configuration. And the right trace 90c is the −2 diopter prism configuration. The center trace 90b is shown in a neutral position, meaning no correction is made. With this center trace 90b, the invention has a dioptic range of 4.0. As each prism rotates away from neutral, towards the left trace 90a or right trace 90c, the refraction becomes greater until it reaches its maximum corrective capability at +/−2.0 diopters. Please note this is only an example, the dioptic prism strength can, and typically will be greater than that described in FIGS. 4A and B. The line running through each of the three traces 90a, 90b and 90c in FIG. 4 and FIG. 5 illustrates line of sight.

Now referring to FIG. 5, a typical prescription lens 60 in conjunction with the invention's rotating prisms is shown. FIG. 4 shows the prisms in three different configurations. Each of three traces 90d, 90e and 90f in this example shows each prism in different states of rotation. The left trace 90d is the +3 diopter prism configuration. The center trace 90e is the +1 diopter prism configuration. And the right trace 90l is the −1 diopter prism configuration.

In this example, the patient's prescription corrects his or her vision to 1.0 diopter. A center trace 90e shows the outer and inner prisms 32 and 34 in the neutral 0 diopter position with the prescription lens 60 shown above the two prisms 32 and 34. As the prisms 32 and 34 rotate away from neutral, towards left or right traces 90d or 90f the amount of correction becomes greater, until it reaches its maximum corrective capability at +3.0 and −1.0 diopters. Therefore, a ray trace of the VPG will create a single adjustable focal point movable to any X/Y coordinates within the given range of the variable prisms 32 and 34.

In addition, other embodiments include variable prism eyeglasses 10 consisting of one rotating and one counter-rotating prism lens in only one eye without a prescription lens, or, alternatively, one rotating and one counter-rotating prism lens in only one eye with a prescription lens. Still other embodiments consist of a single variable prism integrated into the prescription lens in one eye, or alternatively, a variable prism integrated into the prescription lens for both eyes. The present description does not preclude other embodiments that may be envisioned within the spirit and intent of the present invention.

Figure 6:
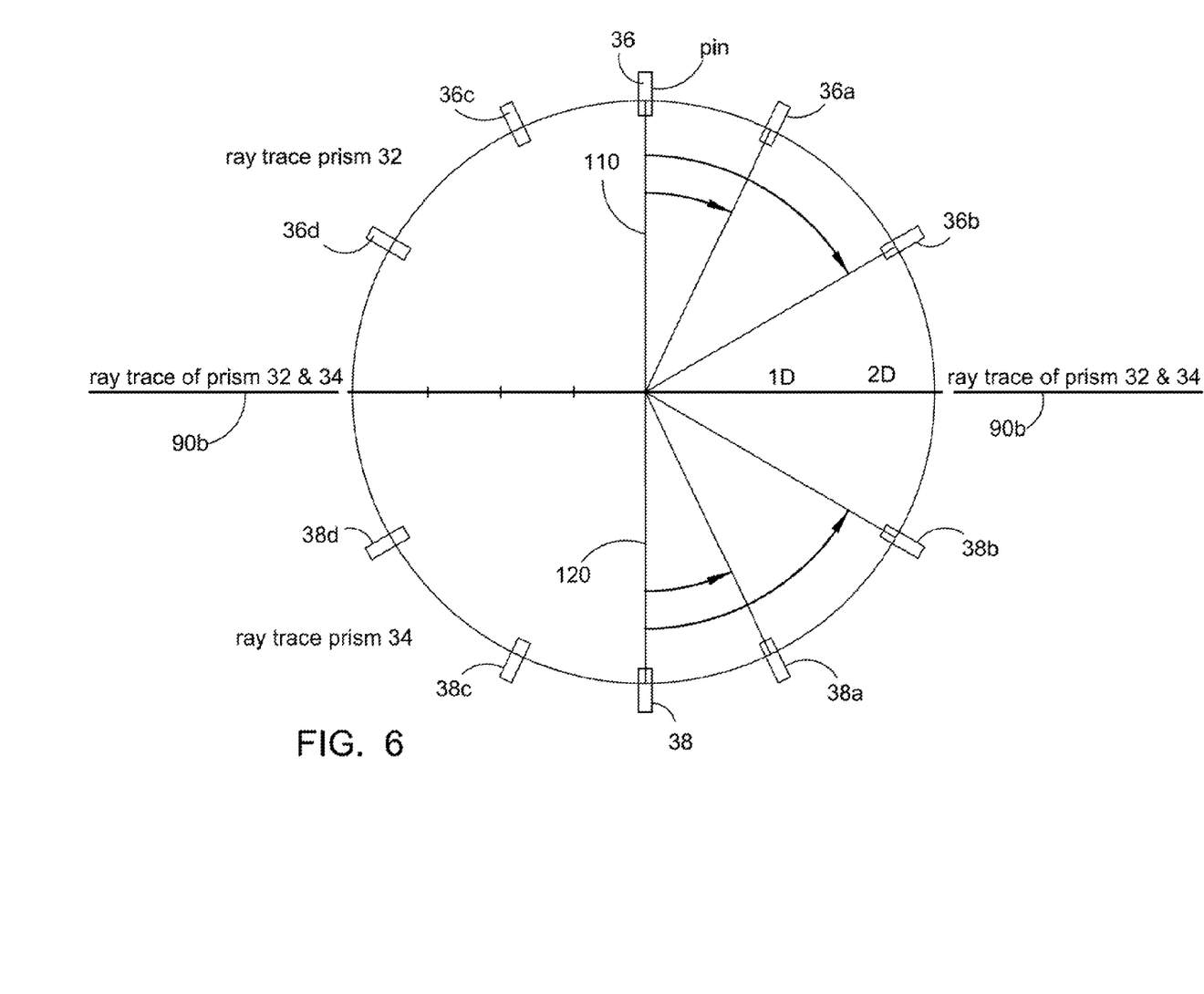
FIG. 6 depicts a partial view of numerous positions of rotatable pins used to change the diopters of the prisms to treat Strabismus in the present invention.

Referring next to FIG. 6 a partial view of prism holders 24a and 24b is shown illustrating the full degree of travel. Also shown is the attachment mechanism 100 of the eyeglass frame 22 for reference purposes only. The invention can be used in two different ways, actively and passively, both of which correct the center of vision of the user. Variable prism eyeglasses 10 (not shown in this figure) are used to actively and thereby therapeutically and passively (non-therapeutically) correct strabismus. Alternatively, the VPG's 10 can be used only therapeutically. Another alternative is to use the VPG's 10 non-therapeutically.

Referring again to FIG. 6, a partial view is shown of numerous positions of first and second rotatable pins 36 and 38 used to change the diopters of the prisms to treat strabismus in the present invention. As shown in FIG. 6, the first rotatable pin 36 is associated with the upper prism 32, while the second rotatable pin 38 is associated with the inner prism 34. A first rotatable pin 36 is shown in a +1 diopter position 36a and in a +2 diopter position 36b. A second rotatable pin 38 is shown in a +1 diopter position 38a and a +2 diopter position 38b. Conversely, and to the left side of FIG. 6, the first rotatable pin 36 is shown in a −1 diopter position 36c. This rotatable pin 36 is also shown in a −2 diopter position 36d. Additionally, the second rotatable pin 38 is shown in −1 and −2 diopter positions 38c and 38d.

FIG. 6 also illustrates the invention's ability to vary the prism dioptic range of the patient's prescription eyeglasses. As the two prisms 32 and 34 (not shown) are rotated, one clockwise (cw), and the other counterclockwise (ccw), the positive upper portion of the ray trace 110 from an outer prism 32 is canceled out by the negative lower portion of the ray trace 120 from an inner prism 34 resulting in a neutral ray trace 90b in the horizontal direction in this figure.

This canceling action was shown previously in FIG. 4 in the center ray trace 90b. Examples throughout this application have used prisms of +1 diopter. However, any reasonable power can be used within the limits of the designed prism characteristics.

Figure 7:
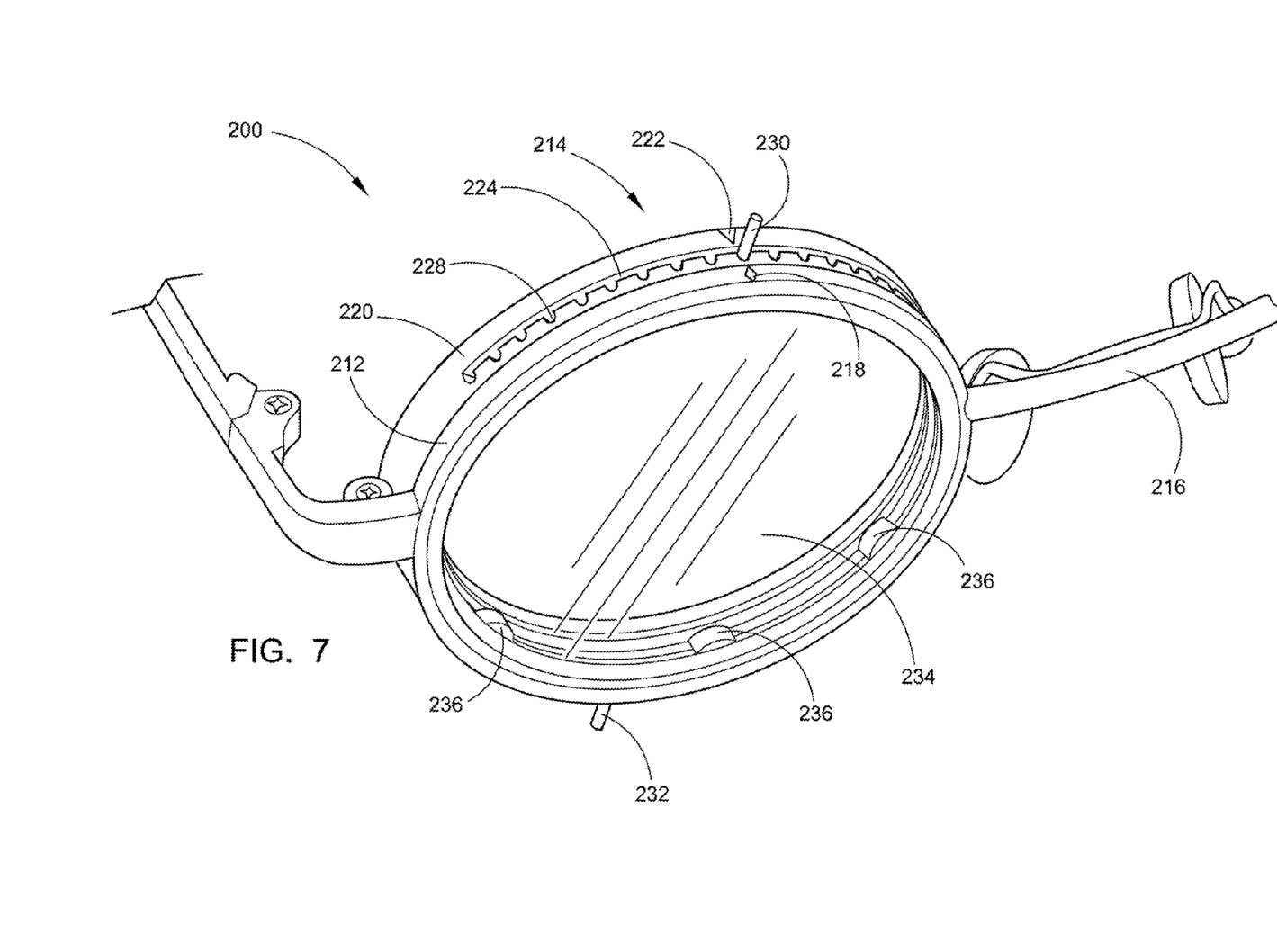
FIG. 7 depicts a perspective view of the right side of the Variable Prism Eyeglasses.

Referring now to the drawings describing the improvements in the present invention, wherein similar parts of the Variable Prism Eyeglasses 200 are identified by like reference numerals, there is seen in FIG. 7 a perspective view of the right side of the Variable Prism. Eyeglasses 200 having a conventional eyeglass frame 212. The eyeglass frame 212 holds two primary ring assemblies 214 one on each side of the central bridge 216 and has a frame reference point 218 centrally located over each primary ring 220. The right side of the primary ring assemblies 214 has been illustrated due to the fact that they are typical units. The primary ring assembly 214 consists of a primary ring 220 with a primary ring reference point 222 located at the center of the upper detent channel 224 that is set towards the rear of the primary ring 220. A second lower detent channel 226 is located one hundred and eighty degrees from the upper detent channel 224 and set towards the front of the primary ring 220. A plurality of registration detents 228 are located on the sides of each of upper detent channel 224 and lower detent channel 226 (shown only in FIG. 9) to register with the upper and lower prism lens pins 230 and 232. The corrective lens 234 is attached at the front of the primary ring 220 with three of the magnets 236 visible in the lower section of FIG. 7. A change in the depth and the shape of the detents 228 may occur where less restriction of the upper and lower prism lens pins 230 and 232 may be required and the sharp corners can be rounded off and will still remain within the scope of the application.

Figure 8:
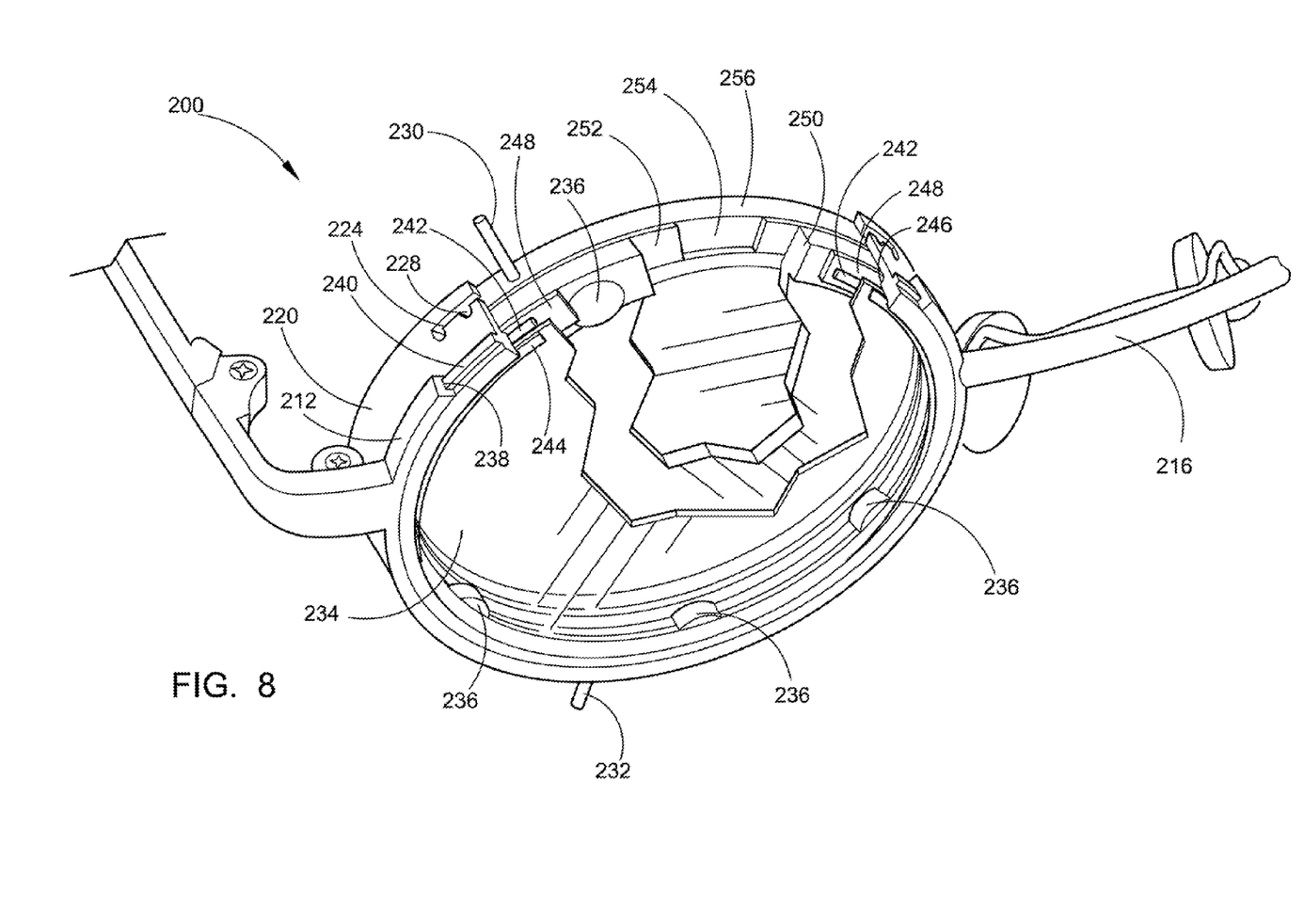
FIG. 8 depicts a perspective view of the right side of the Variable Prism Eyeglasses with segments broken away to clearly illustrate the internal mechanisms.

FIG. 8 depicts a perspective view of the right side of the Variable Prism Eyeglasses 200 with segments broken away to clearly illustrate the internal mechanisms. The eyeglass frame 212 is held in place on the primary ring assembly 214 by the means of a groove 238 that mates with a circumferential rib 240 on the outer surface of the primary ring 220. The corrective lens 234 is held in place by the means of adhesive 242 and the snap ring 244. An internal shoulder 246 in the primary ring 220 restrains the variable thickness washer 248 which is adjacent to the outer prism lens 250. The outer prism lens 250 contains one or more magnets 236 which hold the invention together. The magnets 236 are held by the magnetic force against the variable thickness washer 248 and arraigned in a circular fashion around the outermost perimeter of outer prism lens 250. A standard thickness washer 252 that is permanently attached to the groove 254 in the inner prism lens 256 and separates it from the outer prism lens 250. The upper prism lens pin 230 is shown attached to the inner prism lens 256 and the lower prism lens pin 232 is similarly attached to the outer prism lens 250.

Figure 9:
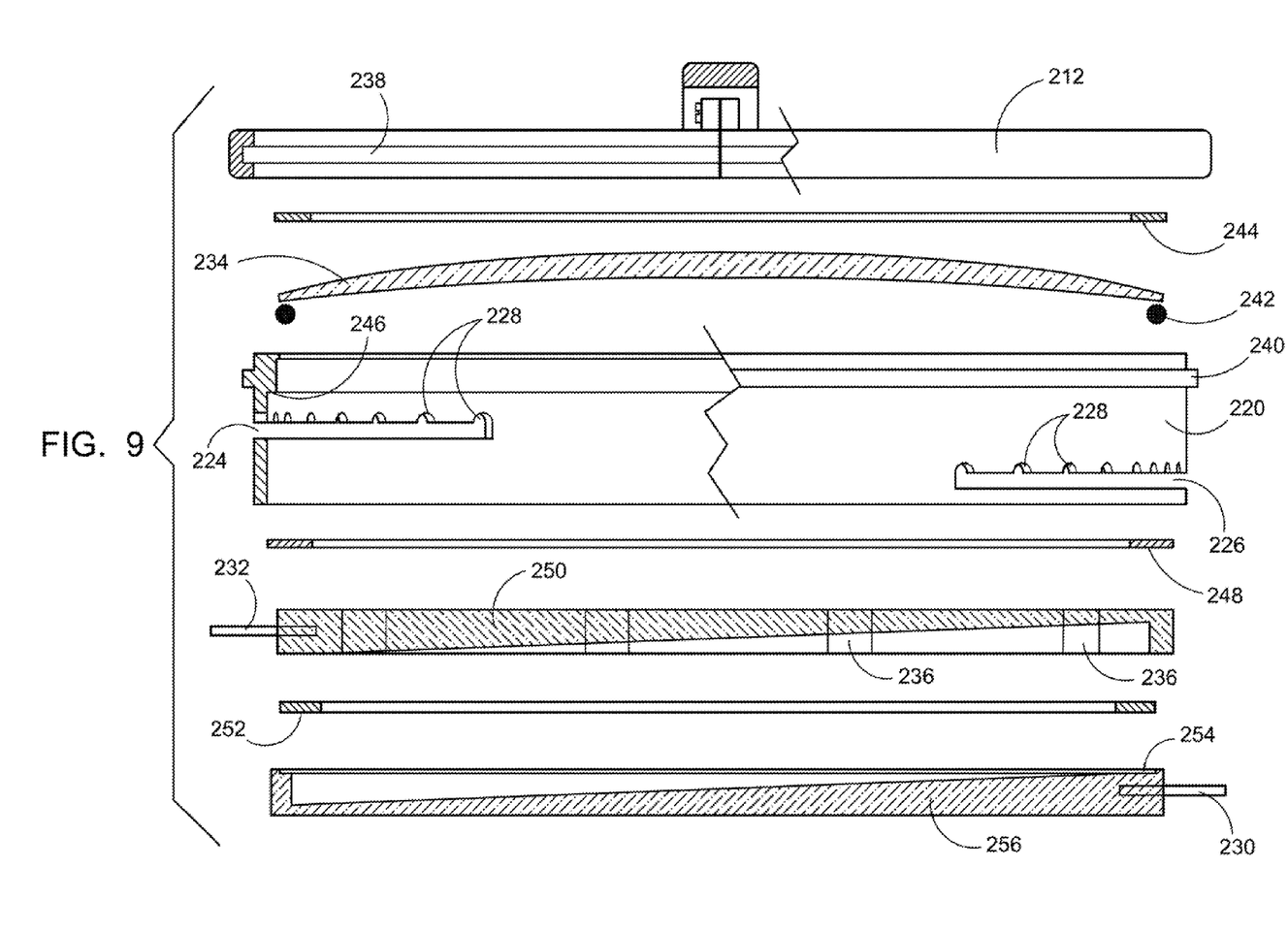
FIG. 9 depicts an exploded side view of one side of the Variable Prism Eyeglasses.

FIG. 9 depicts an exploded side view of one side of the Variable Prism. Eyeglasses 200 with the location of the groove 238 depicted in the eyeglass frame 212. The snap ring 244 holds the corrective lens 234 in the primary ring 220 while the adhesive 242 keeps it from rotating. The primary ring 220 has the right side cut away to depict a cross sectional view of the location of the internal shoulder 246 and the upper detent channel 224 with registration detents 228. The right side of the primary ring 220 depicts the location of the lower detent channel 226 and the registration detents 228. The variable thickness washer 248 is shown above the outer prism lens 250 illustrating the general location of the magnets 236 and the lower prism lens pin 232. The standard thickness washer 252 is shown above the groove 254 where it is attached in the inner prism lens 256. The upper prism lens pin 230 and the lower prism lens pin 232 are inserted into the thickest cross sectional area along the edge of the outer and inner prism lenses 250 and 256.

It must be understood at this time that a wave washer with a confining snap ring groove and snap ring at the inner surface of the primary ring 220 could replace the magnets to exert the forces required in this application and will be additionally covered within the scope of this application.

Figure 10:
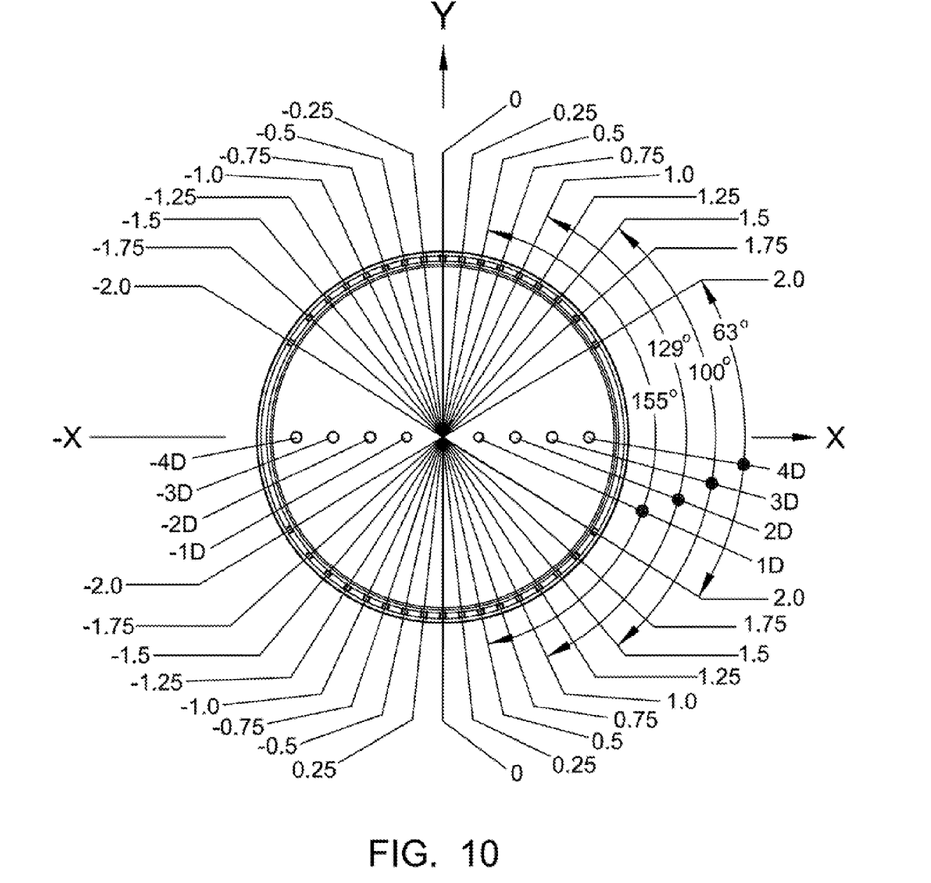
FIG. 10 depicts a diagrammatic illustration of a patient whose strabismus has horizontal displacement also known as esotropia and/or exotropia.

FIG. 10 depicts a diagrammatic illustration of a patient whose strabismus has horizontal displacement (esotropia or exotropia). With the Variable Prism Eyeglasses 200 where outer and inner prism lenses 250 and 256 are used, one with the base up and the other with base down, are counter rotated symmetrically about a center line that is perpendicular to their flat surfaces, the ray trace generated is a straight line. Using these glasses a patient that has −3 diopters esotropia would adjust the upper prism lens pin 230 from 90*(0 diopters), CW −40* to (1.5 diopters) and the lower prism lens pin 232 from 270* (0 diopters), CCW +40* (1.5 diopters) the 1.5 D of the outer prism lens 250 adds to the 1.5 D of the inner prism lens 256 to equal 3 D total movement along the X axis from the point marked −3 D to 0 diopters.

The numbers shown on the top and bottom of the lens are in reference to the dioptic displacement relative to the number of degrees each prism is independently rotated, when counter rotated symmetrically, the sum of the dioptic displacement is equal to that of the total dioptic correction. In FIG. 10 each prism has a total refractive power of 2 diopters, 4 when used together and counter rotated to the maximum corrective power.

Figure 11:
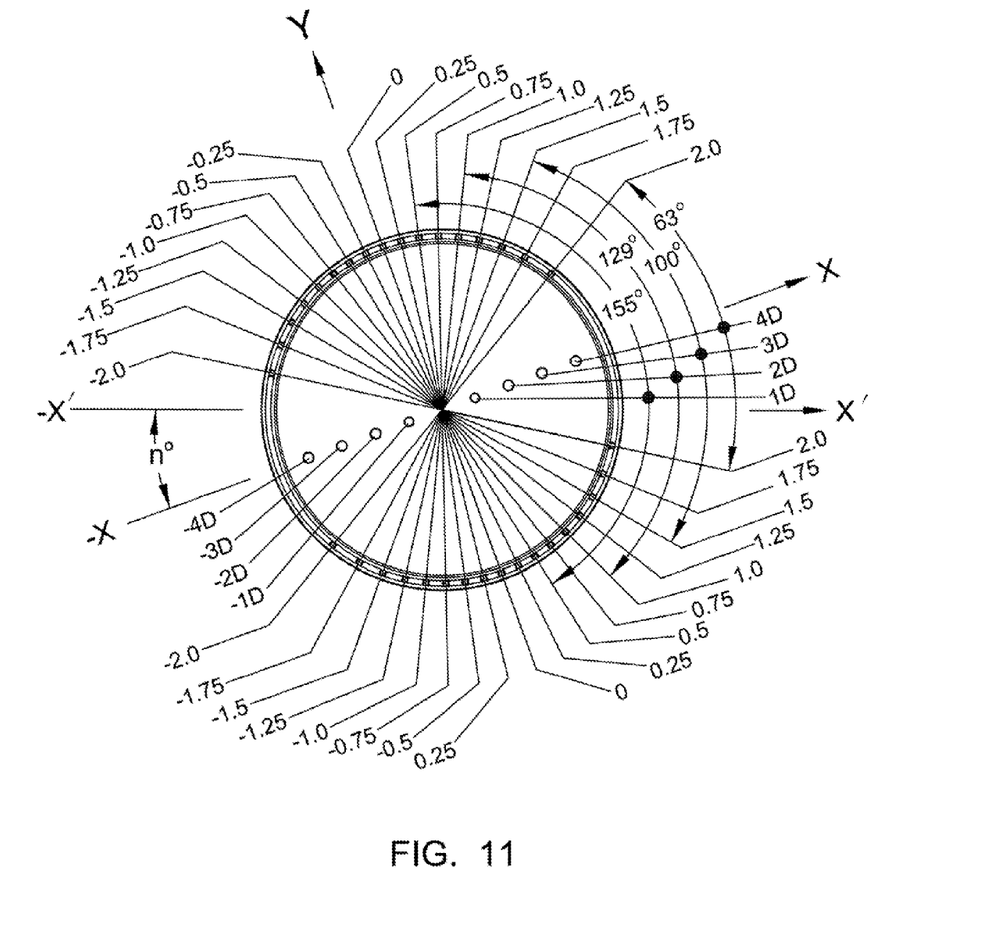
FIG. 11 depicts a diagrammatic illustration of patient whose strabismus has both vertical and horizontal displacement.

FIG. 11 depicts a diagrammatic illustration of a patient whose strabismus has both vertical and horizontal displacement (hypertropia and esotropia/exotropia). The difference between FIG. 10 and FIG. 11 is minor. The two depictions are in fact the same; FIG. 10 has simply been rotated (n) degrees in order to show how a patient who's strabismus has vertical displacement (hypertropia) as well as horizontal displacement (esotropia or exotropia).

The conditions of strabismus are; "eso", or one eye turning inward, "exo", or one eye turning outward, "hyper", or one eye turning upward we identify the eye turning upward as the hypertropic eye as in "right hypertropia." "Phoria" is a tendency for the eye to become out of alignment typically with fatigue, drug or alcohol use "Tropia" occurs when the eye is out of alignment even when both eyes are unobstructed.

Figure 12A:
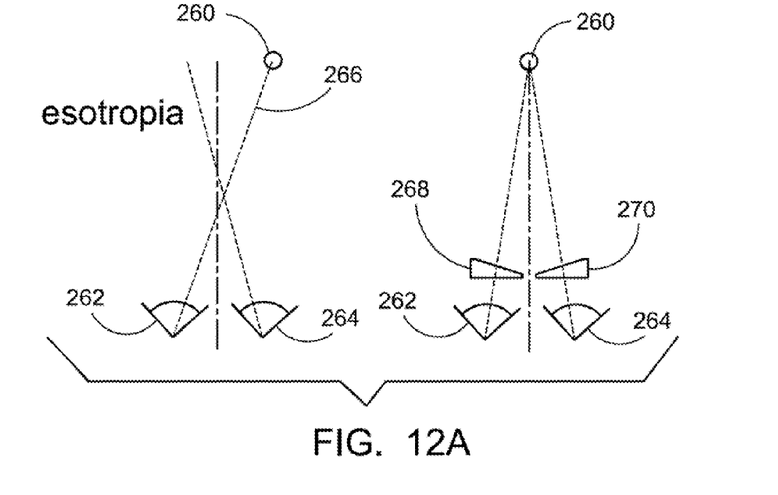
FIG. 12A is an explanation of the esotropia condition.
Figure 12B:
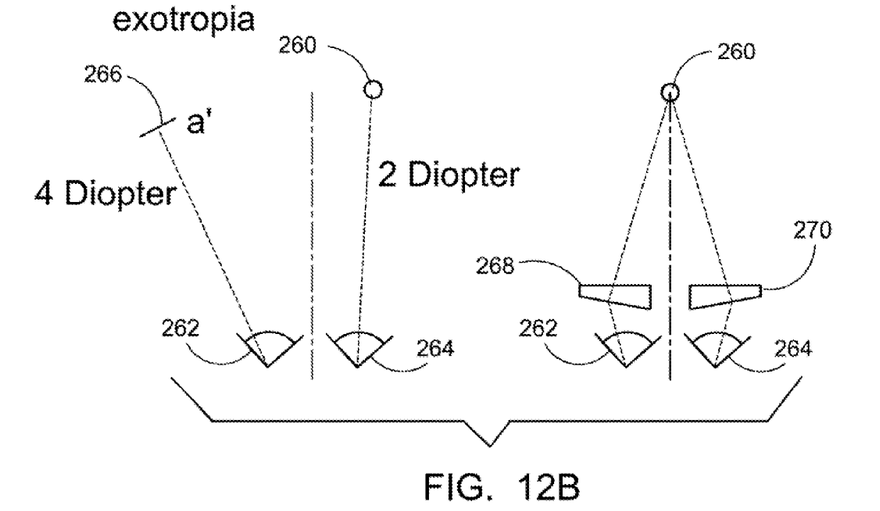
FIG. 12B is an explanation of the exotropia condition.

FIG. 12A and FIG. 12B show two conditions of strabismus (esotropia and exotropia) during which only one eye is tracking the target the other eye is seeing a non related image. The right hand column in FIG. 12A and FIG. 12B show the effect that two variable prisms have in bringing the two eyes together to fuse and track on one visual target. If the strabismus condition persists the brain will eventually suppress the signal from the eye not tracking the target, the eventual result is typically amblyopia, also known as "lazy eye." When one eye stops functioning properly, the eye-brain connection becomes poor and the brain suppresses the information from the off target eye in order to prevent disturbing double vision.

One eye (B) will track the target against its background the other eye (A) will see only the background (A'). With treatment the mal-aligned eye may improve at a fluctuating rate making it very difficult for non-adjustable prism glasses to correct this condition. If this condition if not treated, it could result in the brain ignoring the image from eye (A) thus resulting in amblyopia or blindness in the weaker eye.

FIG. 12B shows where right eye 264 will track the target 260 against its background while the left eye 262 will see only the background 266. If this condition if not treated it may result is the brain ignoring the image from left eye 262 or amblyopia.

Most patients who have strabismus show signs of just horizontal displacement (esotropia or exotropia). However when both of these conditions are present, both horizontal and vertical eye displacement, the patient will be diagnosed as having hypertropia as well as the more common esotropia or exotropia.

When the patient is diagnosed with vertical eyes displacement (hypertropia) in addition to horizontal displacement (esotropia or exotropia) the health care provider will prescribe a given angle relative to the degree of vertical displacement. This angle will then be used as a measurement for the degree (n) the primary ring 220 will be rotated. This angle will then be in alignment with the patients horizontal and vertical eye displacement and can then be treated the same way a patient with esotropia or exotropia depicted in FIG. 10 would be treated.

The Variable Prism Eyeglasses 10 shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing a Variable Prism Eyeglasses 10 in accordance with the spirit of this disclosure, and such changes, alternations and modifications as would occur to those skilled in the art are considered to be within the scope of this design as broadly defined in the appended claims.

Consequently, while the foregoing description has described the principle and operation of the present invention in accordance with the provisions of the patent statutes, it should be understood that the invention may be practiced otherwise as illustrated and described above and that various changes in the size, shape, and materials, with or without the use of electronics or other methods of creating variable prism glasses as well as the details of the illustrated construction may be made, within the scope of the appended claims without departing from the spirit and scope of the invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

We claim:

1. A variable prism eyeglasses device comprising:
   a) an eyeglass frame, and one or more primary rings rotatably attached to said eyeglass frame wherein said eyeglass frame includes a groove and said primary ring includes a circumferential rib, whereby said primary ring is rotatably held in place within said eyeglass frame by mating said grove and said circumferential rib;
   b) an inner prism lens having an integrated prism lens pin, and an outer prism lens having an integrated prism lens pin, rotatably held within said primary ring;
   c) a detent channel including a plurality of detent registration slots; and
   d) a plurality of magnets held in place within said primary ring;
   whereby each of said inner and outer prism lenses independently rotate within said primary ring, and can be independently adjusted to varying diopters by movement of said prism lens pins within said detent channel, and wherein said lens pins are moved into said detent registration slots and held in place by said magnets.

2. The variable prism eyeglasses device, according to claim 1, wherein said inner prism lens and said outer prism lens includes a standard thickness washer there between, which fits within a groove in said inner prism lens.

3. The variable prism eyeglasses device, according to claim 1, wherein said inner prism lens includes an upper prism lens pin, which moves within an upper detent channel, and wherein said outer prism lens includes a lower prism lens pin which moves within a lower detent channel, such that said each prism lens may be adjusted independently and simultaneously.

4. The variable prism eyeglasses device, according to claim 1, wherein said plurality of magnets held in place within said primary ring, includes about six magnets.

5. The variable prism eyeglasses device, according to claim 1, wherein said detent channel including a plurality of detent registration slots, further includes registration detents which are equal to a one-quarter diopter change in the rotation of the prism lens.

6. The variable prism eyeglasses device, according to claim 5, wherein said registration detents are aligned with said magnets such that each detent slot allows the prism lens pin to be securely held by said magnet when said prism lens pin is placed in any of said plurality of registration detent slots.

7. The variable prism eyeglasses device, according to claim 1, wherein said one or more primary rings includes corrective lenses attached thereto.

8. The variable prism eyeglasses device, according to claim 7, wherein said outer prism lens includes a variable thickness washer between said outer prism lens and said corrective lens.

9. The variable prism eyeglasses device, according to claim 7, wherein said corrective lens includes a snap ring and is held in place using adhesive.

10. A method for making variable prism eyeglasses, comprising the steps of:
    a) providing an eyeglass frame wherein said step of providing an eyeglass frame further includes providing an eyeglass frame which includes a groove and providing one or more primary rings which include a circumferential rib, whereby said primary ring is rotatably held in place within said eyeglass frame by mating said grove and said circumferential rib;
    b) providing one or more primary rings rotatably attached to said eyeglass frame;
    c) providing an inner prism lens having an integrated prism lens pin, and an outer prism lens having an integrated prism lens pin, rotatably held within said primary ring;
    d) providing a detent channel including a plurality of detent registration slots; and e) providing a plurality of magnets held in place within said primary ring;

whereby each of said inner and outer prism lenses independently rotate within said primary ring, and can be independently adjusted to varying diopters by movement of said prism lens pins within said detent channel, and wherein said lens pins are moved into said detent registration slots and held in place by said magnets.

11. The method of making variable prism eyeglasses, according to claim 10, wherein said step of providing an inner prism lens having an integrated prism lens pin, and an outer prism lens having an integrated prism lens pin, rotatably held within said primary ring, includes a standard thickness washer placed between said inner prism lens and said outer prism lens, whereby said standard thickness washer fits within a groove in said inner prism lens.

12. The method of making variable prism eyeglasses, according to claim 10, wherein said step of providing an inner prism lens having an integrated prism lens pin, and an outer prism lens having an integrated prism lens pin, rotatably held within said primary ring, further includes providing said inner prism lens including an upper prism lens pin, which moves within an upper detent channel, and providing said outer prism lens including a lower prism lens pin which moves within a lower detent channel, such that said each prism lens may be adjusted independently and simultaneously.

13. The method of making variable prism eyeglasses, according to claim 10, wherein said step of providing a detent channel including a plurality of detent registration slots, further includes providing registration detents which are aligned with a one-quarter diopter change in the rotation of the prism lens.

14. The method of making variable prism eyeglasses, according to claim 13, wherein said evenly spaced registration detents are aligned with said magnets such that each detent slot allows the prism lens pin to be securely held by said magnets when said prism lens pin is placed in said registration detent.

15. The method of making variable prism eyeglasses, according to claim 10, wherein said step of providing one or more primary rings attached to said eyeglass frame, further includes providing corrective lenses attached to said primary rings.

16. The method of making variable prism eyeglasses, according to claim 15, wherein said step of providing a corrective lens further includes providing a variable thickness washer between said outer prism lens and said corrective lens.

17. The method of making variable prism eyeglasses, according to claim 15, wherein said step of providing a corrective lens includes providing a corrective lens which includes a snap ring and is held in place using adhesive.

18. A method for using variable prism eyeglasses to correct strabismus, or double vision in a patient, comprising the steps of:
a) providing variable prism eyeglasses having an eyeglass frame wherein said eyeglass frame further includes providing an eyeglass frame which includes a groove and providing one or more primary rings which include a circumferential rib whereby said primary ring is rotatably held in place within said eyeglass frame by mating said grove and said circumferential rib, and further including an inner prism lens and an outer prism lens including a prism lens pin attached to each prism lens, and further including a detent channel with registration detents to accommodate said prism lens pins, whereby said prism lenses are independently and simultaneously rotatable for vision adjustment;
b) placing said variable prism eyeglasses in front of the eyes of a patient; and
c) rotating said inner prism lens and said outer prism lens until vision is apparently corrected.

* * * * *